(12) United States Patent
Liang et al.

(10) Patent No.: US 12,450,431 B2
(45) Date of Patent: Oct. 21, 2025

(54) METHOD AND APPARATUS FOR GENERATING TEXT

(71) Applicants: Beijing Wodong Tianjun Information Technology Co., Ltd., Beijing (CN); Beijing Jingdong Century Trading Co., Ltd., Beijing (CN)

(72) Inventors: Jiahui Liang, Beijing (CN); Junwei Bao, Beijing (CN); Youzheng Wu, Beijing (CN)

(73) Assignees: Beijing Wodong Tianjun Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 273 days.

(21) Appl. No.: 18/273,698

(22) PCT Filed: Dec. 15, 2021

(86) PCT No.: PCT/CN2021/138296
§ 371 (c)(1),
(2) Date: Jul. 21, 2023

(87) PCT Pub. No.: WO2022/156434
PCT Pub. Date: Jul. 28, 2022

(65) Prior Publication Data
US 2024/0078385 A1    Mar. 7, 2024

(30) Foreign Application Priority Data

Jan. 22, 2021 (CN) .......................... 202110085890.0

(51) Int. Cl.
G06F 40/279 (2020.01)
(52) U.S. Cl.
CPC .................................. G06F 40/279 (2020.01)

(58) Field of Classification Search
CPC ...... G06F 40/279; G06F 40/211; G06F 40/30; G06F 16/383; G06F 16/35; G06F 16/381;
(Continued)

(56) References Cited

U.S. PATENT DOCUMENTS

2018/0121785 A1* 5/2018 Min ........................ G06N 3/006
2019/0258700 A1   8/2019 Beaver et al.
(Continued)

FOREIGN PATENT DOCUMENTS

CN        107844469 A     3/2018
CN        108280112 A     7/2018
(Continued)

OTHER PUBLICATIONS

Research on Chinese Automatic Text Summarization Based on Seq2Seq Model, 59 pages including pp. 1-53, 2018, with English Abstract.
(Continued)

*Primary Examiner* — Huyen X Vo
(74) *Attorney, Agent, or Firm* — BLANK ROME LLP

(57) ABSTRACT

A method and apparatus for generating text. The method comprises: receiving original text and an element tag (201); generating an encoded text feature vector, and an encoded sentence feature vector of each sentence in the original text; executing decoding steps comprising: determining a word attention weight of each word in the original text at the current moment on the basis of a hidden state vector of the decoder at the current moment and the encoded text feature vector (2031); determining a sentence attention weight of each sentence in the original text; determining a normalized word attention weight of each word in the original text at the current moment; and estimating a target word at the current moment; and generating target text on the basis of the target word output by the decoder at each moment (204).

15 Claims, 6 Drawing Sheets

(58) Field of Classification Search
CPC ..... G06F 16/9554; G06F 16/38; G06N 3/045; G06N 3/08
See application file for complete search history.

(56) References Cited

U.S. PATENT DOCUMENTS

| | | | |
|---|---|---|---|
| 2019/0278835 A1 | 9/2019 | Cohan et al. | |
| 2019/0325066 A1 | 10/2019 | Krishna et al. | |
| 2019/0370338 A1 | 12/2019 | Kong | |
| 2020/0311350 A1 | 10/2020 | Makino et al. | |
| 2021/0158815 A1* | 5/2021 | Lee | G06V 10/764 |
| 2022/0043975 A1* | 2/2022 | Li | G06N 7/01 |

FOREIGN PATENT DOCUMENTS

| | | |
|---|---|---|
| CN | 109885673 A | 6/2019 |
| CN | 110399606 A | 11/2019 |
| CN | 111897949 A | 11/2020 |
| CN | 113779277 A | 12/2021 |
| JP | 2002-183171 A | 6/2002 |
| JP | 2019-057266 A | 4/2019 |
| JP | 2020-166735 A | 10/2020 |
| KR | 102173382 B1 | 11/2020 |

OTHER PUBLICATIONS

Bo-han Li et al., Multi-task Learning for Abstractive Text Summarization, Computer Knowledge and Technology, vol. 16, No. 31, pp. 20-25, 48, Nov. 2020, with English Abstract.
International Search Report for PCT/CN2021/138296, dated Mar. 9, 2022, 2 pgs.
Kimura Fukuda et al, Enhancing query-oriented abstract model with statement encoder, DEIM Forum 2019 A2-4, 21 Pages.

* cited by examiner

METHOD AND APPARATUS FOR GENERATING TEXT

CROSS-REFERENCE TO RELATED APPLICATIONS

This patent application is a national stage of International Application No. PCT/CN2021/138296, filed on Dec. 15, 2021, which claims the priority from Chinese Patent Application No. 202110085890.0, filed on Jan. 22, 2021. Both of the aforementioned applications are hereby incorporated by reference in their entireties.

TECHNICAL FIELD

Embodiments of the present disclosure relate to the field of computer technology, particularly to the field of deep learning, and more particularly to a method and apparatus for generating a text.

BACKGROUND

A text summarization refers to a conversion from an original text into a refined text containing only key information, and mainly includes an extractive summarization and an abstractive summarization. The extractive summarization is mainly to extract a key word or short sentence from a source document through an algorithm such as a clustering or sequence labeling algorithm. The abstractive summarization is mainly to adopt a deep learning method to and use the frame of a Sequence2Sequence (sea2seq), to first encode the source document as a hidden vector of a fixed dimension by using an encoder and then input the hidden vector into a decoder side to perform word generation step by step.

In the related art, on the basis of a seq2seq model, a pointer generator network introduces a copying mechanism and a coverage mechanism. The copying mechanism calculates the attention weights of all words in the source document at every decoding step, and can selectively copy a part of an original text to a summary, and thus can generate a word that has never been appeared in a vocabulary. The coverage mechanism accumulates the attention weights in the current step and all the previous steps at every decoding step, preventing the part that has a high weight in the original text being continuously copied.

SUMMARY

Embodiments of the present disclosure propose a method and apparatus for generating a text, and a computer readable medium.

According to a first aspect, some embodiments of the present disclosure provide a method for generating a text. The method includes: receiving an original text and an element tag; generating, based on the original text, an encoded text feature vector and an encoded sentence feature vector of each sentence in the original text using a pre-trained encoder; and performing, using a decoder that is pre-trained, following decoding steps: determining, based on a hidden state vector of the decoder at a current moment and the encoded text feature vector, a word attention weight of each word in the original text at the current moment; determining a sentence attention weight of each sentence in the original text at the current moment, based on the hidden state vector of the decoder at the current moment, the encoded sentence feature vector and the element tag; determining a normalized word attention weight of each word in the original text at the current moment based on the sentence attention weight and the word attention weight; and estimating a target word at the current moment based on the encoded text feature vector and normalized word attention weights of words in the original text at the current moment, where the method further comprises: generating a target text based on target words outputted by the decoder at moments.

In some embodiments, the generating, based on the original text, an encoded text feature vector and an encoded sentence feature vector of each sentence in the original text using a pre-trained encoder comprises: generating a text feature matrix based on the original text; inputting the text feature matrix into a pre-trained first encoder to obtain the encoded text feature vector; inputting the text feature matrix into a pre-trained second encoder to obtain an encoded word feature vector of each word in the original text; determining a sentence feature vector of a sentence in the original text based on encoded word feature vectors of words in the sentence in the original text; and inputting sentence feature vector of each sentence in the original text into a pre-trained third encoder to obtain the encoded sentence feature vector of each sentence in the original text.

In some embodiments, the estimating a target word at the current moment based on the encoded text feature vector and the normalized word attention weights of words in the original text at the current moment comprises: generating a context feature vector at the current moment based on the encoded text feature vector and the normalized word attention weights of the words in the original text at the current moment; and estimating the target word at the current moment based on the context feature vector and the encoded text feature vector.

In some embodiments, the element tag is generated by: performing clustering on the original text to obtain a cluster tag set; determining a target cluster tag from the cluster tag set; and determining the target cluster tag as the element tag.

In some embodiments, the performing clustering on the original text to obtain a cluster tag set comprises: segmenting the original text with a preset punctuation mark as a segmentation boundary, to obtain a short sentence set; deleting, from the short sentence set, a short sentence not meeting a preset condition to obtain an updated short sentence set; extracting, based on the updated short sentence set, word features of words in a short sentence using a pre-trained feature extraction model, and determining a sentence feature of the short sentence based on the word features; and determining, based on sentence features of short sentences in the updated short sentence set, cluster tags of the short sentences in the updated short sentence set using a pre-trained clustering model, to obtain the cluster tag set.

According to a second aspect, some embodiments of the present disclosure provide an apparatus for generating a text. The apparatus includes: a receiving unit, configured to receive an original text and an element tag; an encoding unit, configured to generate, based on the original text, an encoded text feature vector and an encoded sentence feature vector of each sentence in the original text using a pre-trained encoder; and a decoding unit, configured to perform, using a decoder that is pre-trained, following decoding steps: determining, based on a hidden state vector of the decoder at a current moment and the encoded text feature vector, a word attention weight of each word in the original text at the current moment; determining a sentence attention weight of each sentence in the original text at the current moment, based on the hidden state vector of the decoder at the current moment, the encoded sentence feature vector and the element tag; determining a normalized word attention weight of each word in the original text at the current moment based on the sentence attention weight and the word attention weight; and estimating a target word at the current moment based on the encoded text feature vector and normalized word attention weights of words in the original text at the current moment; and a generating unit, configured to generate a target text based on target words outputted by the decoder at moments.

In some embodiments, the encoding unit further comprises: a feature matrix generating module, configured to generate a text feature matrix based on the original text; a first encoding module, configured to input the text feature matrix into a pre-trained first encoder to obtain the encoded text feature vector; a second encoding module, configured to input the text feature matrix into a pre-trained second encoder to obtain an encoded word feature vector of each word in the original text; a sentence feature vector generating module, configured to determine a sentence feature vector of a sentence in the original text based on encoded word feature vectors of words in the sentence in the original text; and a third encoding module, configured to input sentence feature vector of each sentence in the original text into a pre-trained third encoder to obtain the encoded sentence feature vector of each sentence in the original text.

In some embodiments, the decoding unit further includes: a context feature vector generating module, configured to generate a context feature vector at the current moment based on the encoded text feature vector and the normalized word attention weights of the words in the original text at the current moment; and a target word outputting module, configured to estimate the target word at the current moment based on the context feature vector and the encoded text feature vector.

In some embodiments, the apparatus further includes an element tag generating unit, where the element tag generating unit is configured to: perform clustering on the original text to obtain a cluster tag set; determine a target cluster tag from the cluster tag set; and determine the target cluster tag as the element tag.

In some embodiments, the element tag generating unit further comprises: a segmenting module, configured to segment the original text with a preset punctuation mark as a segmentation boundary, to obtain a short sentence set; a screening module, configured to delete, from the short sentence set, a short sentence not meeting a preset condition to obtain an updated short sentence set; a feature extracting module, configured to extract, based on the updated short sentence set, word features of words in a short sentence using a pre-trained feature extraction model, and determine a sentence feature of the short sentence based on the word features; and a tag generating module, configured to determine, based on sentence features of short sentences in the updated short sentence set, cluster tags of the short sentences in the updated short sentence set using a pre-trained clustering model, to obtain the cluster tag set.

According to a third aspect, some embodiments of the present disclosure provide an electronic device. The electronic device includes: one or more processors; and a storage apparatus, storing one or more programs, where the one or more programs, when executed by the one or more processors, cause the one or more processors to implement the method according to any one of the implementations described in the first aspect.

According to a fourth aspect, some embodiments of the present disclosure provide a computer readable medium. The computer readable medium stores a computer program thereon, where the program, when executed by a processor, implements the method according to any one of the implementations described in the first aspect.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of the present disclosure are further described below in detail with reference to the accompanying drawings. It may be appreciated that embodiments described herein are merely used for explaining the relevant disclosure, rather than limiting the disclosure. In addition, it should be noted that, for ease of description, only the parts related to the relevant disclosure are shown in the accompanying drawings.

It should be noted that embodiments in the present disclosure and the features in the embodiments may be combined with each other on a non-conflict basis. Embodiments of the present disclosure will be described below in detail with reference to the accompanying drawings.

Figure 1:
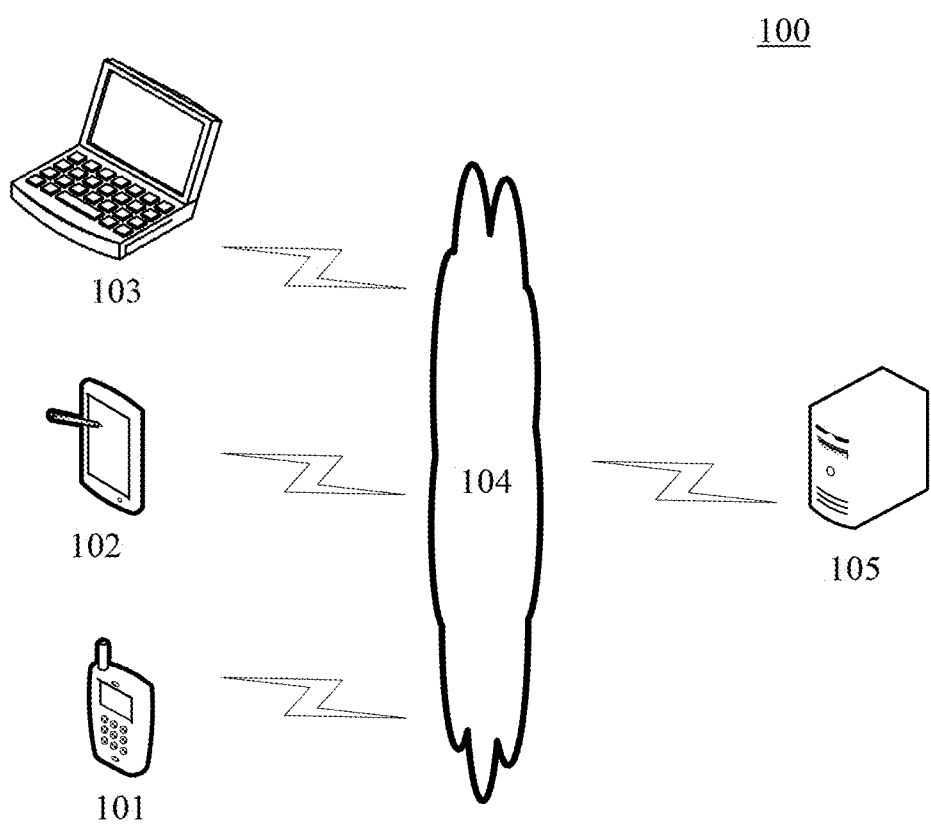
FIG. 1 is a diagram of an example system architecture in which embodiments of the present disclosure may be applied.

FIG. 1 illustrates an example system architecture 100 in which a method for generating a text or an apparatus for generating a text according to an embodiment of the present disclosure may be applied.

As shown in FIG. 1, the system architecture 100 may include terminal device(s) 101, 102, 103, a network 104 and a server 105. The network 104 serves as a medium providing a communication link between the terminal device(s) 101, 102, 103 and the server 105. The network 104 may include various types of connections, for example, wired or wireless communication links, or optical fiber cables.

A user may use the terminal device(s) 101, 102, 103 to interact with the server 105 via the network 104, to receive or send a message, etc. For example, an original text may be sent to the server, or a target text may be received form the server.

The terminal device(s) 101, 102, 103 may be hardware or software. When being the hardware, the terminal device(s) 101, 102, 103 may be electronic devices having a communication function, the electronic devices including, but not limited to, a smartphone, a tablet computer, an e-book reader, a laptop portable computer, a desktop computer, etc. When being the software, the terminal device(s) 101, 102, 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various services, for example, a backend data server processing an original text uploaded by the terminal device(s) 101, 102, 103. The backend data server may perform processing such as encoding and decoding on the received original text, and feed back a processing result (e.g., a target text) to the terminal devices.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be noted that the method for generating a text provided by embodiments of the present disclosure may be performed by the terminal device(s) 101, 102, 103, or by the server 105. Correspondingly, the apparatus for generating a text may be provided in the terminal device(s) 101, 102, 103, or in the server 105, which will not be specifically defined here.

Figure 2:
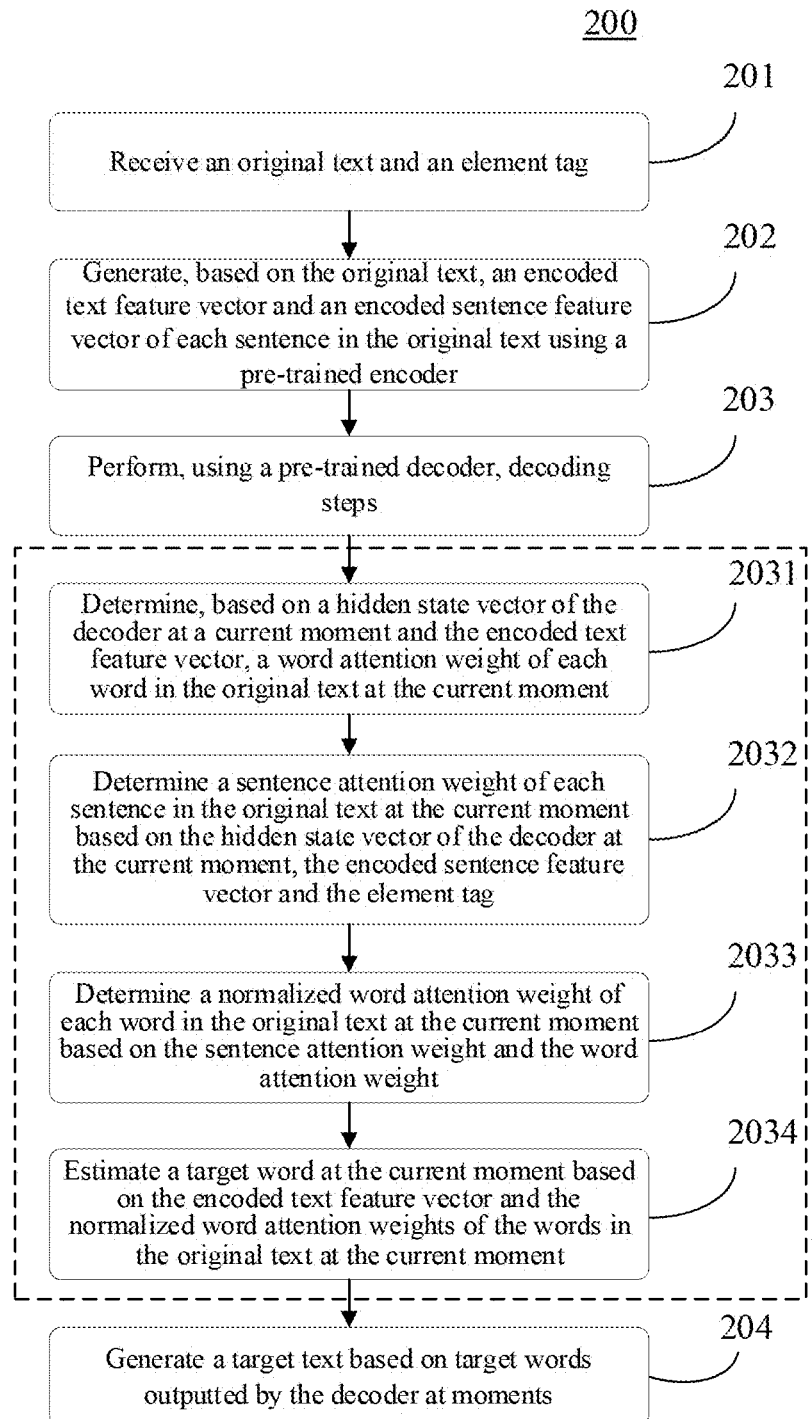
FIG. 2 is a flowchart of a method for generating a text according to an embodiment of the present disclosure.

Further referring to FIG. 2, FIG. 2 illustrates a flow 200 of a method for generating a text according to an embodiment of the present disclosure. The method for generating a text includes the following steps.

Step 201, receiving an original text and an element tag.

In this embodiment, the element tag may represent an expectation of a user for the content of a target text, and may be set in advance by the user according to actual requirements.

As an example, the original text may be detailed information of a commodity, and the target text may be a summary of the information of the commodity. If the user expects that the target text may contain content related to "appearance," the user can set the element tag to be "appearance," and then send the detailed information of the commodity and the element tag to an executing body (which may be, for example, the server shown in FIG. 1) of this embodiment. As another example, if the user expects that the target text may contain content related to "sales volume," the user can set the element tag to be "sales volume."

In some alternative implementations of this embodiment, the element tag is generated by: performing clustering on the original text to obtain a cluster tag set; determining a target cluster tag from the cluster tag set; and determining the target cluster tag as the element tag.

In this implementation, a cluster tag may represent a content feature of the original text. An executing body may extract cluster tags from the original text using a clustering algorithm, and then select the element tag therefrom. In this way, the correlation between the element tag and the content of the original text can be ensured.

As an example, the executing body may input the original text into a pre-trained text clustering model, which may be, for example, TF-IDF, word2vec, etc., to obtain the cluster tag set of the original text. Thereafter, the executing body may present the cluster tag set to the user, for the user to select a target cluster tag therefrom, thereby determining the cluster tag selected by the user as the element tag.

Step 202, generating, based on the original text, an encoded text feature vector and an encoded sentence feature vector of each sentence in the original text using a pre-trained encoder.

In this embodiment, the encoder is used to convert the original text into an encoded text feature vector of a preset dimension, and to convert each sentence in the original text into an encoded sentence feature vector. Here, the encoded text feature vector includes word vectors of all words in the original text, for representing the content feature of the original text. The encoded sentence feature vector of a sentence includes word vectors of all words in the sentence, for representing the content feature of the sentence. A word vector may represent the position of a word in a preset vocabulary.

The encoder may adopt various types of deep learning models, which may be, for example, a CNN (convolutional neural network), an RNN (recurrent neural network), or a GRU (gated recurrent unit).

As an example, the executing body may adopt an LSTM (long short-term memory) network as the encoder. The executing body may input the original text into the encoder to obtain the encoded text feature vector of the preset dimension, and then input each sentence in the original text into the encoder respectively to obtain the encoded sentence feature vector of each sentence.

In some alternative implementations of this embodiment, the encoded text feature vector and the encoded sentence feature vector of each sentence in the original text may be obtained by: generating a text feature matrix based on the original text; inputting the text feature matrix into a pre-trained first encoder to obtain the encoded text feature vector; inputting the text feature matrix into a pre-trained second encoder to obtain an encoded word feature vector of each word in the original text; determining a sentence feature vector of a sentence in the original text based on an encoded word feature vector of the words in the sentence in the original text; and inputting the sentence feature vector of each sentence in the original text into a pre-trained third encoder to obtain the encoded sentence feature vector of each sentence in the original text.

In this implementation, the executing body may adopt an embedding matrix to convert the original text into the text feature matrix. Here, the embedding matrix represents a corresponding relationship between a word and a word feature value, and the word feature value represents the position of the word in a vocabulary. Then, the executing body obtains the encoded text feature vector through the first encoder, and obtains the encoded sentence feature vector of each sentence in the original text through the second encoder and the third encoder.

As an example, the first encoder may be an LSTM encoder, the second encoder and the third encoder may be GRU encoders. The executing body inputs the text feature matrix into the first encoder to encode the text feature matrix as an encoded text feature vector of a first preset dimension, and inputs the text feature matrix into the second encoder to encode each word vector in the text feature matrix as an encoded word vector of a second preset dimension. Then, the executing body uses the mean value of the encoded word vectors of words in a sentence as the sentence feature vector of the sentence, and inputs the sentence feature vector of each sentence into the third encoder to obtain the encoded sentence feature vector of each sentence in the original text. As another example, the executing body may alternatively use the largest value in the encoded word vectors of the words in a sentence as the sentence feature vector of the sentence, and may alternatively use the encoded word vector of the word ranked at the end of a sentence as the sentence feature vector of the sentence.

Step 203, performing, using a pre-trained decoder, decoding steps 2031-2034.

In this embodiment, the decoder is used to estimate a target word from the encoded text feature vector outputted by the encoder. The decoder may adopt the same deep learning model as the encoder.

Step 2031, determining, based on a hidden state vector of the decoder at a current moment and the encoded text feature vector, a word attention weight of each word in the original text at the current moment.

Generally, the decoder outputs the hidden state vector at the current moment at every decoding step. The hidden state vector is used to represent the state parameters of hidden layers of the decoder in the previous decoding step.

In this embodiment, the word attention weight of a word determined by the hidden state vector at the current moment and the encoded text feature vector can represent the probability that the decoder selects this word at the current moment.

As an example, the executing body inputs the encoded text vector B obtained in step 202 into a pre-trained LSTM decoder, and the LSTM decoder performs decoding on the encoded text feature vector step by step. Assuming that the LSTM completes an n-th decoding step, the hidden state vector at the current moment is the hidden state vector $A_n$ corresponding to the n-th decoding step. The executing body calculates and obtains the word attention weight $\{C_i^n\}$ of each word at the current moment based on the hidden state vector $A_n$ and the encoded text feature vector B. Here, C denotes a word attention weight, and i denotes an i-th word in the original text. Then, when the LSTM completes an (n+1)-th decoding step, the hidden state vector at the current moment is the hidden state vector $A_{n+1}$ corresponding to the (n+1)-th decoding step. The executing body calculates and obtains the word attention weight $\{C_i^{n+1}\}$ of each word at the current moment based on $A_{n+1}$ and the encoded text feature vector B.

Step 2032, determining a sentence attention weight of each sentence in the original text at the current moment based on the hidden state vector of the decoder at the current moment, the encoded sentence feature vector and the element tag.

In this embodiment, the sentence attention weight represents a degree of relevance of the content feature (e.g., the feature such as a grammatical structure, and a semantic meaning) of the sentence to the element tag, and the higher the degree of relevance is, the higher the numerical value of the sentence attention weight is.

In an example, the executing body may determine the numerical value of the element tag based on a preset list of corresponding relationships between element tags and numerical values, and convert the numerical value into a vector, thus obtaining an element tag vector. Next, the executing body may combine the hidden state vector and the element tag vector into a combined vector. Then, the executing body respectively calculates the degree of relevance of the encoded sentence feature vector of each sentence to the combined vector, thus obtaining the sentence attention weight of each sentence.

Step 2033, determining a normalized word attention weight of each word in the original text at the current moment based on the sentence attention weight and the word attention weight.

In this embodiment, the sentence attention weight of a sentence represents the degree of relevance of the content feature of the sentence to the element tag. In this way, the normalized word attention weight may also represent a degree of relevance of a word to the element tag.

As an example, the executing body may use the product of the sentence attention weight and the word attention weight as the normalized word attention weight, and thus, the normalized word attention weight is positively related to the degree of relevance of the word to the element tag.

Step 2034, estimating a target word at the current moment based on the encoded text feature vector and the normalized word attention weights of the words in the original text at the current moment.

In this embodiment, the decoder loaded on the executing body determines a confidence level of each word in the original text based on the encoded text feature vector and the normalized word attention weights of the words in the original text at the current moment, and then determines a word with a highest confidence level as the target word at the current moment. Then, the decoder performs a next decoding step to output a target word at a next moment until the decoder fully decodes the encoded text feature vector, and thus, a target word sequence can be obtained.

In some alternative implementations of this embodiment, a context feature vector at the current moment is generated based on the encoded text feature vector and the normalized word attention weights of the words in the original text at the current moment; and the target word at the current moment is estimated based on the context feature vector and the encoded text feature vector.

In this implementation, the context feature vector may represent the effect of the context on the confidence level of the word in the original text. In this way, the encoder may introduce the effect of the context on the word in the process of determining the target word at the current moment, and thus, the degree of matching between the target word and the content of the original text can be further improved.

Step 204, generating a target text based on target words outputted by the decoder at moments.

In this embodiment, the executing body may concatenate, according to a time sequence, target words outputted by the decoder, to obtain the target text. Since each target word is from the original text and related to the element tag, the target text may characterize a text extracted from the original text by the executing body according to the element tag.

Figure 3:
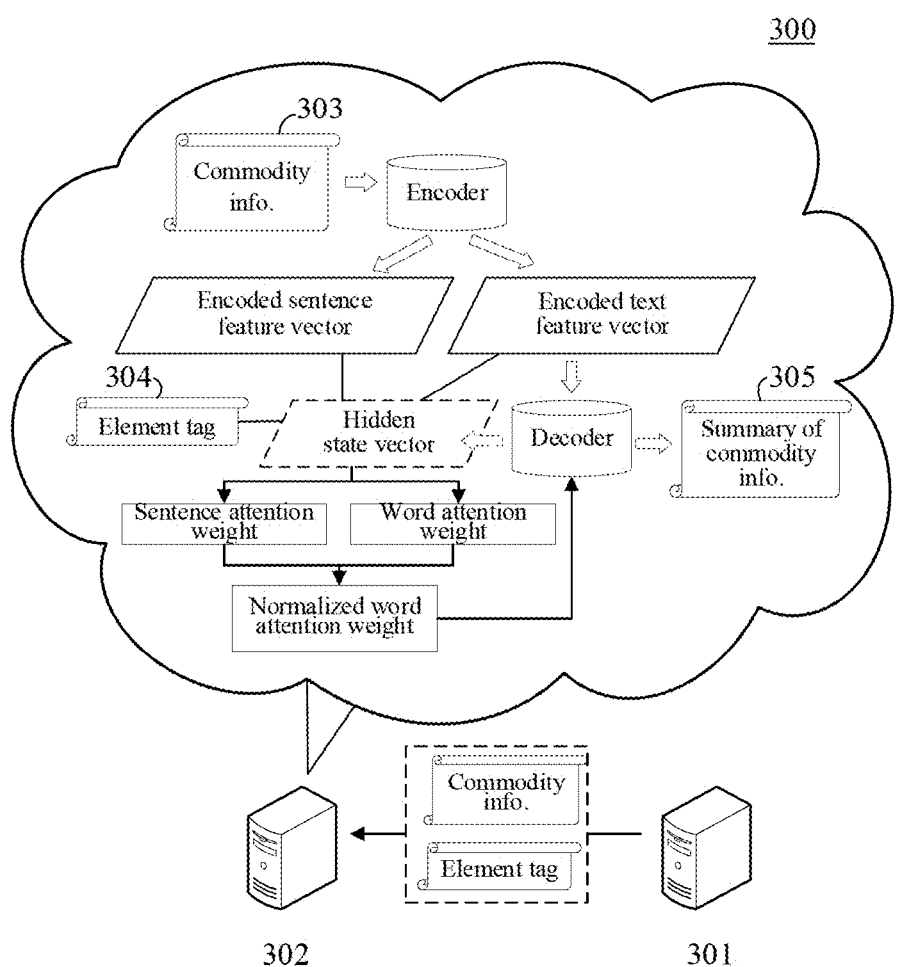
FIG. 3 is a schematic diagram of an application scenario of an embodiment of the method for generating a text shown in FIG. 2.

Further referring to FIG. 3, FIG. 3 is a schematic diagram of an application scenario of an embodiment of the method shown in FIG. 2. In the scenario 300 shown in FIG. 3, the original text is commodity information 303, which may include, for example, a commodity name and detailed information of a commodity, and the target text is a summary 305 of the commodity information. A terminal device 301 may send the commodity information 303 and an element tag 304 to a server 302 via a network. The server 302 is loaded with a pre-trained text generation model, and the text generation model may be an LSTM encoder and an LSTM decoder that include an attention module. The server 302 inputs the received commodity information and element tag into the text generation model, to perform the following text generation step. The LSTM encoder encodes the commodity information as an encoded text feature vector of a third preset dimension, and encodes sentences in the commodity information as encoded sentence feature vectors of a fourth preset dimension. Then, for the encoded text feature vector, the LSTM encoder outputs a hidden state vector at a current moment step by step. Next, the attention module determines word attention weights of words in the commodity information at the current moment according to the encoded text feature vector and the hidden state vector, determines sentence attention weights of the sentences in the commodity information at the current moment according to the encoded sentence feature vectors, the element tag and the hidden state vector, and uses the product of the word attention weight of a word and the sentence attention weights of all the sentences including the word as a normalized word attention weight of the word, thus obtaining a normalized word attention weight of each word in the original text at the current moment. Then, the encoder estimates a target word at the current moment according to the encoded text feature vector and the normalized word attention weights of the words in the original text at the current moment, and concatenates target words at various moments according to a time sequence into a target text. Thus, the summary of the commodity information can be obtained, and the degree of relevance of the content of the summary to the element tag is relatively high.

According to the method and apparatus for generating a text provided in embodiments of the present disclosure, the original text is compressed through the encoder, the word attention weights of the words are determined through the decoder, the sentence attention weights of sentences are determined based on the correlations between the sentences in the original text and the element tag, the normalized word attention weight of a word is then determined based on the word attention weight and the sentence attention weight, a target word is estimated based on the normalized word attention weights of the words, and the target text is finally generated based on the target word. Thus, the correlation between the sentences and words in the target text and the element tag is relatively high, thereby improving the accuracy and controllability of generating a text.

Figure 4:
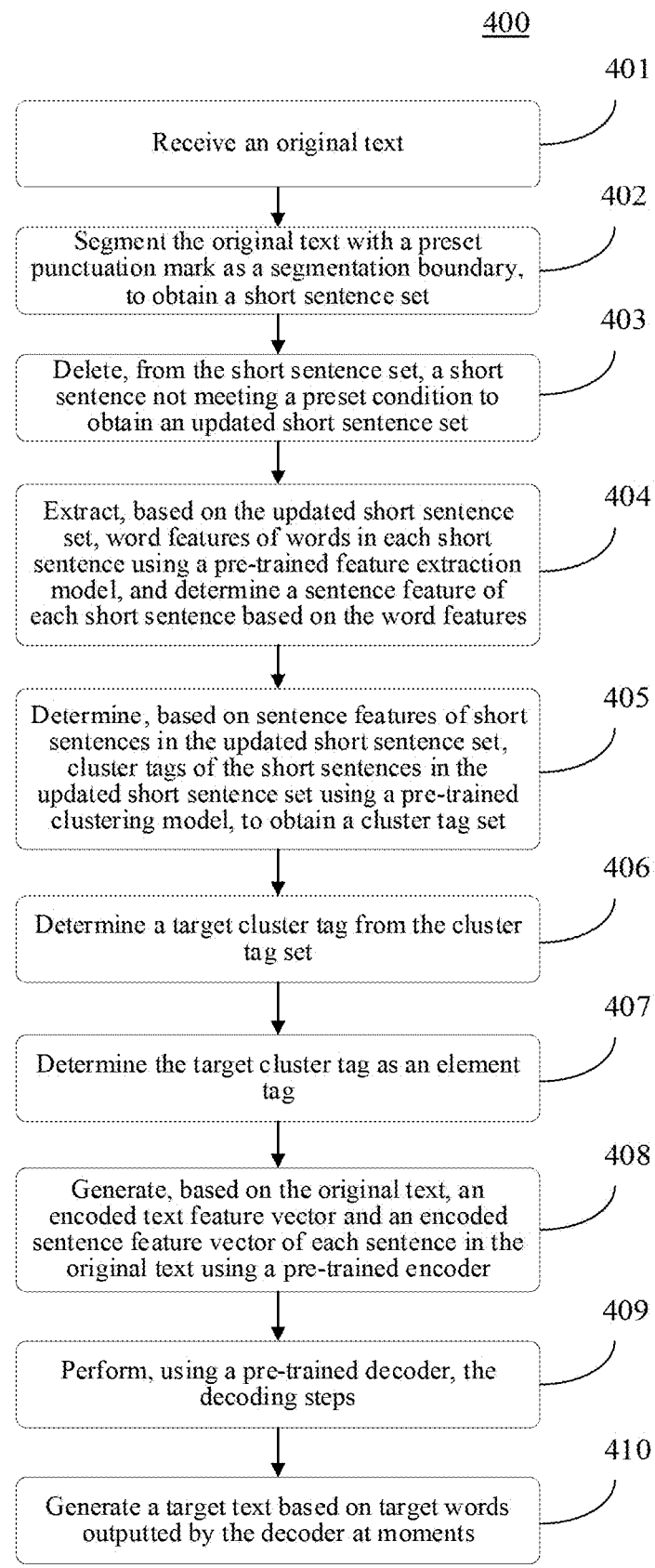
FIG. 4 is a flowchart of the method for generating a text according to another embodiment of the present disclosure.

Further referring to FIG. 4, FIG. 4 illustrates a flow 400 of the method for generating a text according to another embodiment of the present disclosure. The flow 400 of the method for generating a text includes the following steps.

Step 401, receiving an original text.

Step 402, segmenting the original text with a preset punctuation mark as a segmentation boundary, to obtain a short sentence set.

In this embodiment, an executing body may segment the original text into several short sentences by using a period, an exclamation mark, or a question mark as the segmentation boundary, thus obtaining the short sentence set. Thus, the semantic integrity of each short sentence can be ensured.

Step 403, deleting, from the short sentence set, a short sentence not meeting a preset condition to obtain an updated short sentence set.

As an example, it is possible to adopt the preset condition such as: the short sentence includes at least one comma and the length of the short sentence is within a preset length range. The executing body screens the short sentences obtained in step 402 based on the preset condition, and deletes the short sentence that does not meet the condition. Thus, the interference of noise data can be reduced.

Step 404, extracting, based on the updated short sentence set, word features of words in each short sentence using a pre-trained feature extraction model, and determining a sentence feature of each short sentence based on the word features.

In this embodiment, the sentence feature of the short sentence represents a content feature of the short sentence, which may include, for example, a grammatical structure feature and a semantic feature of the short sentence.

The feature extraction model may adopt models existing or possible in the future such as TF-IDF or word2vec, which is not limited in the embodiments of the present disclosure.

As an example, the executing body may adopt a pre-trained BERT (Bidirectional Encoder Representation from Transformers) model to extract a word feature from each short sentence, and use a vector obtained by performing weighted averaging on word features as the sentence feature of the short sentence.

Step 405, determining, based on sentence features of short sentences in the updated short sentence set, cluster tags of the short sentences in the updated short sentence set using a pre-trained clustering model, to obtain a cluster tag set.

As an example, the executing body may cluster the sentence features of short sentences by using the K-means (K-means clustering algorithm) model, to obtain the cluster tag of each short sentence, and then obtain the cluster tag set corresponding to the entire updated short sentence set.

The clustering model may alternatively be a clustering model existing or possible in the future such as a variational auto-encoder or a DBSCAN (Density-Based Spatial Clustering of Applications with Noise, a density-based clustering algorithm).

Step 406, determining a target cluster tag from the cluster tag set.

Step 407, determining the target cluster tag as an element tag.

In this embodiment, the cluster tag may represent a content feature of the original text, and the element tag represents a content expectation of a user for a target text. The determination of the element tag from the cluster tag set may take into account the content feature of the original text and the content expectation of the user.

Step 408, generating, based on the original text, an encoded text feature vector and an encoded sentence feature vector of each sentence in the original text using a pre-trained encoder. This step corresponds to step 202 described above, and thus, the details will not be repeatedly described here.

Step 409, performing, using a decoder that is pre-trained, following decoding steps. This step corresponds to step 203 described above, and thus, the details will not be repeatedly described here.

Step 410, generating a target text based on target words outputted by the decoder at moments. This step corresponds to step 204 described above, and thus, the details will not be repeatedly described here.

It can be seen from FIG. 4 that, the flow 400 of the method for generating a text in this embodiment reflects the steps of extracting the cluster tag of the short sentence in the original text based on the clustering algorithm and determining the element tag from the cluster tag. Accordingly, the correlation between the element tag and the original text can be improved, which makes the correlation between the sentence and word in the generated target text and the element tag higher. Thus, the accuracy and controllability of generating a text can be further improved.

Figure 5:
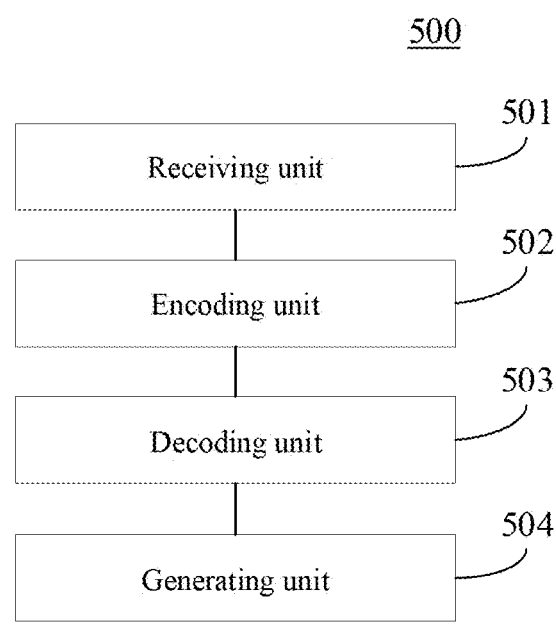
FIG. 5 is a schematic structural diagram of an apparatus for generating a text according to an embodiment of the present disclosure.

Further referring to FIG. 5, as an implementation of the method shown in the above drawings, an embodiment of the present disclosure provides an apparatus 500 for generating a text. The embodiment of the apparatus corresponds to the embodiment of the method shown in FIG. 2. The apparatus may be applied in various electronic devices.

As shown in FIG. 5, the apparatus 500 for generating a text in this embodiment comprises: a receiving unit 501, configured to receive an original text and an element tag; an encoding unit 502, configured to generate, based on the original text, an encoded text feature vector and an encoded sentence feature vector of each sentence in the original text using a pre-trained encoder; and a decoding unit 503, configured to perform, using a decoder that is pre-trained, following decoding steps: determining, based on a hidden state vector of the decoder at a current moment and the encoded text feature vector, a word attention weight of each word in the original text at the current moment; determining a sentence attention weight of each sentence in the original text at the current moment, based on the hidden state vector of the decoder at the current moment, the encoded sentence feature vector and the element tag; determining a normalized word attention weight of each word in the original text at the current moment based on the sentence attention weight and the word attention weight; and estimating a target word at the current moment based on the encoded text feature vector and normalized word attention weights of the words in the original text at the current moment; and a generating unit 504, configured to generate a target text based on target words outputted by the decoder at moments.

In this embodiment, the encoding unit 502 further comprises: a feature matrix generating module, configured to generate a text feature matrix based on the original text; a first encoding module, configured to input the text feature matrix into a pre-trained first encoder to obtain the encoded text feature vector; a second encoding module, configured to input the text feature matrix into a pre-trained second encoder to obtain an encoded word feature vector of each word in the original text; a sentence feature vector generating module, configured to determine a sentence feature vector of a sentence in the original text based on encoded word feature vectors of words in the sentence in the original text; and a third encoding module, configured to input sentence feature vector of each sentence in the original text into a pre-trained third encoder to obtain the encoded sentence feature vector of each sentence in the original text.

In this embodiment, the decoding unit 503 further comprises: a context feature vector generating module, configured to generate a context feature vector at the current moment based on the encoded text feature vector and the normalized word attention weights of the words in the original text at the current moment; and a target word outputting module, configured to estimate the target word at the current moment based on the context feature vector and the encoded text feature vector.

In this embodiment, the apparatus 500 further comprises an element tag generating unit. The element tag generating unit is configured to: perform clustering on the original text to obtain a cluster tag set; determine a target cluster tag from the cluster tag set; and determine the target cluster tag as the element tag.

In this embodiment, the element tag generating unit further comprises: a segmenting module, configured to segment the original text with a preset punctuation mark as a segmentation boundary, to obtain a short sentence set; a screening module, configured to delete, from the short sentence set, a short sentence not meeting a preset condition to obtain an updated short sentence set; a feature extracting module, configured to extract, based on the updated short sentence set, word features of words in a short sentence using a pre-trained feature extraction model, and determine a sentence feature of the short sentence based on the word features; and a tag generating module, configured to determine, based on sentence features of short sentences in the updated short sentence set, cluster tags of the short sentences in the updated short sentence set using a pre-trained clustering model, to obtain the cluster tag set.

Figure 6:
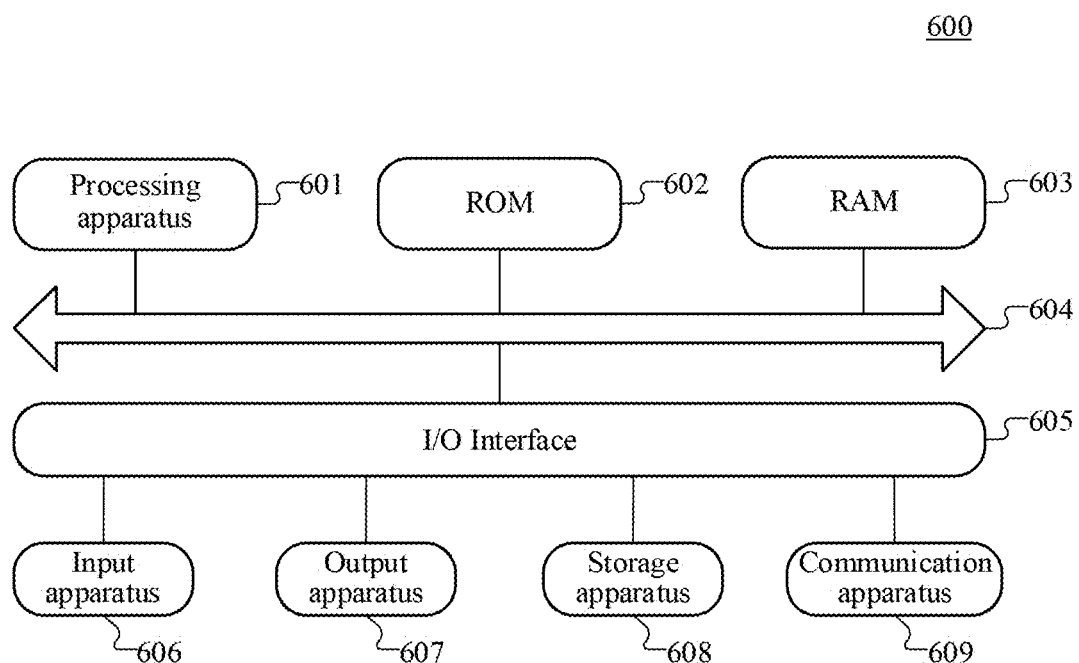
FIG. 6 is a schematic structural diagram of an electronic device adapted to implement embodiments of the present disclosure.

Referring to FIG. 6, FIG. 6 is a schematic structural diagram of an electronic device (e.g., the server or terminal devices shown in FIG. 1) 600 adapted to implement embodiments of the present disclosure. The terminal device in the embodiments of the present disclosure may include, but not limited to, a mobile terminal such as a mobile phone, a notebook computer, a digital broadcast receiver, a PDA (personal digital assistant) and a PAD (tablet computer), and a fixed terminal such as a digital TV and a desktop computer. The terminal device shown in FIG. 6 is merely an example, and should not bring any limitation to the functions and the scope of use of the embodiments of the present disclosure.

As shown in FIG. 6, the electronic device 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 further stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following components are connected to the I/O interface 605: an input apparatus 606 including a touch screen, a touch tablet, a keyboard, a mouse, a camera, a microphone, an accelerometer, a gyroscope, etc.; an output apparatus 607 including such as a liquid crystal display device (LCD), a speaker, a vibrator, etc.; a storage apparatus 608 including a tape, a hard disk, and the like; and a communication apparatus 609. The communication apparatus 609 may allow the electronic device 600 to communicate wirelessly or wired with other devices to exchange data. Although FIG. 6 shows electronic device 600 with various apparatus, it should be understood that it is not required to implement or have all of the apparatus shown. It may be implemented or have more or fewer apparatus instead. Each box shown in FIG. 6 may represent a single apparatus or multiple apparatus as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the abovementioned functionalities as defined by the method of the present disclosure. It should be noted that the computer readable medium in embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In embodiments of the present disclosure, the computer readable storage medium may be any physical medium containing or storing programs which may be used by a command execution system, apparatus or element or incorporated thereto. In embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be the computer readable medium included in the above electronic device, or a stand-alone computer readable medium not assembled into the electronic device. The above computer readable medium carries one or more programs. The one or more programs, when executed by the electronic device, cause the electronic device to: receive an original text and an element tag; generate, based on the original text, an encoded text feature vector and an encoded sentence feature vector of each sentence in the original text using a pre-trained encoder; and perform, using a decoder that is pre-trained, following decoding steps: determining, based on a hidden state vector of the decoder at a current moment and the encoded text feature vector, a word attention weight of each word in the original text at the current moment; determining a sentence attention weight of each sentence in the original text at the current moment, based on the hidden state vector of the decoder at the current moment, the encoded sentence feature vector and the element tag; determining a normalized word attention weight of each word in the original text at the current moment based on the sentence attention weight and the word attention weight; and estimating a target word at the current moment based on the encoded text feature vector and normalized word attention weights of the words in the original text at the current moment; and generate a target text based on target words outputted by the decoder at moments.

A computer program code for performing operations in embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The described units involved in the embodiments of the present disclosure may be implemented by means of software or hardware. The described units may also be provided in a processor. For example, the processor may be described as: a processor comprising a receiving unit, an encoding unit, a decoding unit and a generating unit. Here, the names of these units do not in some cases constitute a limitation to such units themselves. For example, the receiving unit may alternatively be described as "a unit for receiving an original text and an element tag."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in embodiments of the present disclosure are examples.

What is claimed is:

1. A method for generating a text, comprising:
   receiving an original text and an element tag;
   generating, based on the original text, an encoded text feature vector and an encoded sentence feature vector of each sentence in the original text using a pre-trained encoder; and
   performing, using a decoder that is pre-trained, following decoding steps:
   determining, based on a hidden state vector of the decoder at a current moment and the encoded text feature vector, a word attention weight of each word in the original text at the current moment; determining a sentence attention weight of each sentence in the original text at the current moment, based on the hidden state vector of the decoder at the current moment, the encoded sentence feature vector and the element tag; determining a normalized word attention weight of each word in the original text at the current moment based on the sentence attention weight and the word attention weight; and estimating a target word at the current moment based on the encoded text feature vector and normalized word attention weights of words in the original text at the current moment, wherein the method further comprises: generating a target text based on target words outputted by the decoder at moments.

2. The method according to claim 1, wherein the generating, based on the original text, an encoded text feature vector and an encoded sentence feature vector of each sentence in the original text using a pre-trained encoder comprises:

generating a text feature matrix based on the original text;

inputting the text feature matrix into a pre-trained first encoder to obtain the encoded text feature vector;

inputting the text feature matrix into a pre-trained second encoder to obtain an encoded word feature vector of each word in the original text;

determining a sentence feature vector of a sentence in the original text based on encoded word feature vectors of words in the sentence in the original text; and inputting sentence feature vector of each sentence in the original text into a pre-trained third encoder to obtain the encoded sentence feature vector of each sentence in the original text.

3. The method according to claim 1, wherein the estimating a target word at the current moment based on the encoded text feature vector and the normalized word attention weights of words in the original text at the current moment comprises:

generating a context feature vector at the current moment based on the encoded text feature vector and the normalized word attention weights of the words in the original text at the current moment; and estimating the target word at the current moment based on the context feature vector and the encoded text feature vector.

4. The method according to claim 1, wherein the element tag is generated by:

performing clustering on the original text to obtain a cluster tag set;

determining a target cluster tag from the cluster tag set; and determining the target cluster tag as the element tag.

5. The method according to claim 4, wherein the performing clustering on the original text to obtain a cluster tag set comprises:

segmenting the original text with a preset punctuation mark as a segmentation boundary, to obtain a short sentence set;

deleting, from the short sentence set, a short sentence not meeting a preset condition to obtain an updated short sentence set;

extracting, based on the updated short sentence set, word features of words in a short sentence using a pre-trained feature extraction model, and determining a sentence feature of the short sentence based on the word features; and determining, based on sentence features of short sentences in the updated short sentence set, cluster tags of the short sentences in the updated short sentence set using a pre-trained clustering model, to obtain the cluster tag set.

6. An apparatus for generating a text, comprising:
one or more processors; and
a memory storing one or more programs;

wherein the one or more programs, when executed by the one or more processors, cause the one or more processors to perform operations, the operations comprising:

receiving an original text and an element tag;

generating, based on the original text, an encoded text feature vector and an encoded sentence feature vector of each sentence in the original text using a pre-trained encoder; and performing, using a decoder that is pre-trained, following decoding steps: determining, based on a hidden state vector of the decoder at a current moment and the encoded text feature vector, a word attention weight of each word in the original text at the current moment; determining a sentence attention weight of each sentence in the original text at the current moment, based on the hidden state vector of the decoder at the current moment, the encoded sentence feature vector and the element tag; determining a normalized word attention weight of each word in the original text at the current moment based on the sentence attention weight and the word attention weight; and estimating a target word at the current moment based on the encoded text feature vector and normalized word attention weights of words in the original text at the current moment; and generating a target text based on target words outputted by the decoder at moments.

7. The apparatus according to claim 6, wherein the generating, based on the original text, an encoded text feature vector and an encoded sentence feature vector of each sentence in the original text using a pre-trained encoder comprises:

generating a text feature matrix based on the original text;

inputting the text feature matrix into a pre-trained first encoder to obtain the encoded text feature vector;

inputting the text feature matrix into a pre-trained second encoder to obtain an encoded word feature vector of each word in the original text;

determining a sentence feature vector of a sentence in the original text based on encoded word feature vectors of words in the sentence in the original text; and inputting sentence feature vector of each sentence in the original text into a pre-trained third encoder to obtain the encoded sentence feature vector of each sentence in the original text.

8. The apparatus according to claim 6, wherein the estimating a target word at the current moment based on the encoded text feature vector and the normalized word attention weights of words in the original text at the current moment comprises:

generating a context feature vector at the current moment based on the encoded text feature vector and the normalized word attention weights of the words in the original text at the current moment; and estimating the target word at the current moment based on the context feature vector and the encoded text feature vector.

9. The apparatus according to claim 6, wherein the element tag is generated by:

performing clustering on the original text to obtain a cluster tag set;

determining a target cluster tag from the cluster tag set; and determining the target cluster tag as the element tag.

10. The apparatus according to claim 9, wherein the performing clustering on the original text to obtain a cluster tag set comprises:

segmenting the original text with a preset punctuation mark as a segmentation boundary, to obtain a short sentence set;

deleting, from the short sentence set, a short sentence not meeting a preset condition to obtain an updated short sentence set;

extracting, based on the updated short sentence set, word features of words in a short sentence using a pre-trained feature extraction model, and determining a sentence feature of the short sentence based on the word features; and determining, based on sentence features of short sentences in the updated short sentence set, cluster tags of the short sentences in the updated short sentence set using a pre-trained clustering model, to obtain the cluster tag set.

11. A non-transitory computer readable medium, storing a computer program, wherein the program, when executed by a processor, implements operations comprising:

receiving an original text and an element tag;

generating, based on the original text, an encoded text feature vector and an encoded sentence feature vector of each sentence in the original text using a pre-trained encoder; and performing, using a decoder that is pre-trained, following decoding steps:

determining, based on a hidden state vector of the decoder at a current moment and the encoded text feature vector, a word attention weight of each word in the original text at the current moment; determining a sentence attention weight of each sentence in the original text at the current moment, based on the hidden state vector of the decoder at the current moment, the encoded sentence feature vector and the element tag; determining a normalized word attention weight of each word in the original text at the current moment based on the sentence attention weight and the word attention weight; and estimating a target word at the current moment based on the encoded text feature vector and normalized word attention weights of words in the original text at the current moment, wherein the method further comprises: generating a target text based on target words outputted by the decoder at moments.

12. The non-transitory computer readable medium according to claim 11, wherein the generating, based on the original text, an encoded text feature vector and an encoded sentence feature vector of each sentence in the original text using a pre-trained encoder comprises:

generating a text feature matrix based on the original text;

inputting the text feature matrix into a pre-trained first encoder to obtain the encoded text feature vector;

inputting the text feature matrix into a pre-trained second encoder to obtain an encoded word feature vector of each word in the original text;

determining a sentence feature vector of a sentence in the original text based on encoded word feature vectors of words in the sentence in the original text; and inputting sentence feature vector of each sentence in the original text into a pre-trained third encoder to obtain the encoded sentence feature vector of each sentence in the original text.

13. The non-transitory computer readable medium according to claim 11, wherein the estimating a target word at the current moment based on the encoded text feature vector and the normalized word attention weights of words in the original text at the current moment comprises:

generating a context feature vector at the current moment based on the encoded text feature vector and the normalized word attention weights of the words in the original text at the current moment; and estimating the target word at the current moment based on the context feature vector and the encoded text feature vector.

14. The non-transitory computer readable medium according to claim 11, wherein the element tag is generated by:

performing clustering on the original text to obtain a cluster tag set;

determining a target cluster tag from the cluster tag set; and determining the target cluster tag as the element tag.

15. The non-transitory computer readable medium according to claim 14, wherein the performing clustering on the original text to obtain a cluster tag set comprises:

segmenting the original text with a preset punctuation mark as a segmentation boundary, to obtain a short sentence set;

deleting, from the short sentence set, a short sentence not meeting a preset condition to obtain an updated short sentence set;

extracting, based on the updated short sentence set, word features of words in a short sentence using a pre-trained feature extraction model, and determining a sentence feature of the short sentence based on the word features; and determining, based on sentence features of short sentences in the updated short sentence set, cluster tags of the short sentences in the updated short sentence set using a pre-trained clustering model, to obtain the cluster tag set.

* * * * *